L. FRINK.
Milk-Pails.
No. 149,298. Patented April 7, 1874.
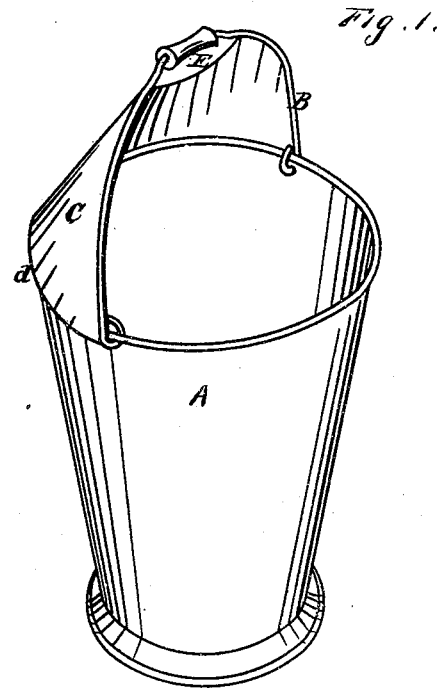
Fig. 1.
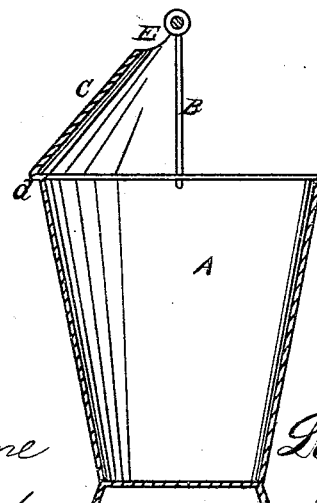
Witnesses
John L. Boone
C. Milton Richardson
Inventor
Ledyard Frink
by Dewey & Co
Attys

UNITED STATES PATENT OFFICE.

LEDYARD FRINK, OF RIO VISTA, CALIFORNIA.

IMPROVEMENT IN MILK-PAILS.

Specification forming part of Letters Patent No. 149,298, dated April 7, 1874; application filed February 3, 1874.

*To all whom it may concern:*

Be it known that I, LEDYARD FRINK, of Rio Vista, Solano county, State of California, have invented a Shield for Buckets; and I do hereby declare the following description and accompanying drawings are sufficient to enable any person skilled in the art or science to which it most nearly appertains to make and use my said invention without further invention or experiment.

My invention relates to a novel construction for pails or buckets, and more particularly such as are used for milking and carrying milk or other liquids that might soil the clothing while being carried from place to place. It consists in the employment of a stationary shield, which encircles one-half of the rim of the pail or bucket, and extends thence up each side of the handle or bail to near the top, so that while one half of the bucket is left open at the top the other half will be closed by the encircling shield.

Referring to the accompanying drawings for a more complete explanation of my invention, Figure 1 is a perspective view of my device. Fig. 2 is a sectional elevation.

A is a pail or bucket of any construction, and provided with the bail B. This bail is made stationary, and standing in the position in which it is used. The shield C consists of a curved sheet of metal, which is cut so as to fit exactly around the rim of the pail, beneath which the flange *d* may be turned, as shown.

The shield encircles one-half of the pail, reaching from one side to the other, where the bail is secured to the pail. From these points the shield extends up along the bail, on either side, to near the top, being secured to the bail. A curved opening, E, is made in the shield, just at the top, so that the hand can be inserted to grasp the bail. The shield and bail are secured so as to remain always in the same position.

By the use of the shield, I am enabled to construct the pail so that, when milking, the clothes of the operator will at all times be protected from being spattered with milk.

The handle being always up, it will be much easier to seize and remove the pail if the cow should kick; and, when carrying the pail, the clothes will be thoroughly protected from being soiled by the contents of the pail.

Having thus described my invention, what I claim, and desire to secure by Letters Patent, is—

As a new article of manufacture, a milk-pail constructed as described, having the shield and bail secured, so as to remain always in the same position, substantially as and for the purpose set forth.

In witness whereof I hereunto set my hand and seal.

LEDYARD FRINK. [L. S.]

Witnesses:
JOHN L. BOONE,
C. MILTON RICHARDSON.